United States Patent
Kerr et al.

(10) Patent No.: US 10,079,993 B2
(45) Date of Patent: Sep. 18, 2018

(54) SYSTEM FOR JUXTAPOSITION OF SEPARATELY RECORDED VIDEOS

(75) Inventors: Edward Kerr, Los Angeles, CA (US); Patrick Malloy, Carrollton, GA (US)

(73) Assignee: Rolestar, Inc., Santa Monica, CA (US)

( * ) Notice: Subject to any disclaimer, the term of this patent is extended or adjusted under 35 U.S.C. 154(b) by 940 days.

(21) Appl. No.: 13/377,814

(22) PCT Filed: Jun. 14, 2010

(86) PCT No.: PCT/US2010/038552
§ 371 (c)(1),
(2), (4) Date: Dec. 12, 2011

(87) PCT Pub. No.: WO2010/144920
PCT Pub. Date: Dec. 16, 2010

(65) Prior Publication Data
US 2012/0081530 A1 Apr. 5, 2012

Related U.S. Application Data

(60) Provisional application No. 61/186,841, filed on Jun. 13, 2009.

(51) Int. Cl.
*H04N 5/00* (2011.01)
*H04N 5/76* (2006.01)
(Continued)

(52) U.S. Cl.
CPC .............. *H04N 5/76* (2013.01); *G11B 27/034* (2013.01); *G11B 27/10* (2013.01); *G11B 27/34* (2013.01); *H04N 5/222* (2013.01)

(58) Field of Classification Search
CPC .............................. H04N 5/23277; H04N 5/76
(Continued)

(56) References Cited

U.S. PATENT DOCUMENTS 7,058,889 B2 * 6/2006 Trovato ................. G10H 1/368
  348/E5.002
7,324,166 B1 * 1/2008 Joslin ....................... H04N 9/75
  348/578

(Continued)

FOREIGN PATENT DOCUMENTS

CN 1463419 A 12/2003
CN 101082901 A 12/2007

OTHER PUBLICATIONS

Japanese Office Action dated Oct. 22, 2013, issued in Japanese Patent Application No. 2012-515221.
(Continued)

*Primary Examiner* — Jeffery Williams
(74) *Attorney, Agent, or Firm* — Stefan J. Kirchanski; Matthew J. Spark; Zuber Lawler & Del Duca LLP

(57) ABSTRACT

An Internet-based application allows a user to sign in to a web site to record a performance thus creating a take of a scene between two actors (actor A and actor B) with the actors alternately speaking their respective lines. The system delivers the actors lines in a teleprompter format. The user can choose which actor to emulate (A or B). If the user decides to perform as actor A, the system will present each line to be spoken by actor A with a time progress bar indicating the speed/timing for that line. The take is recorded by the user's computer using a computer operated camera and microphone. The teleprompter timer ensures that the user's performance is in sync with the Actor B even though the various takes are actually recorded at different times. This allows the takes to be played in tandem, side by side, seemingly performing together.

20 Claims, 16 Drawing Sheets

Figure 1:
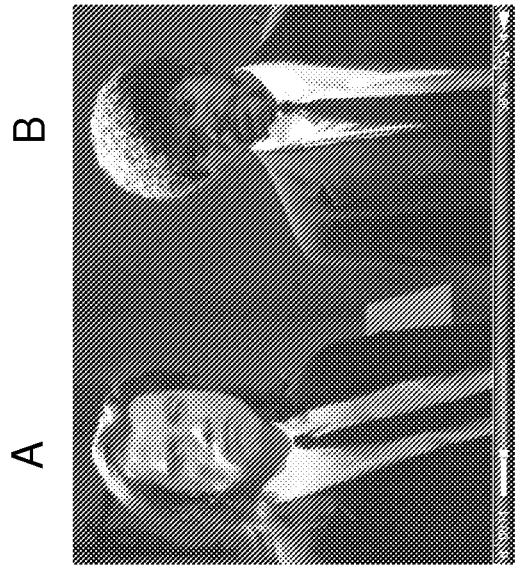

(51) Int. Cl.
*G11B 27/34* (2006.01)
*G11B 27/034* (2006.01)
*G11B 27/10* (2006.01)
*H04N 5/222* (2006.01)

(58) Field of Classification Search
USPC .................................................. 348/722, 61
See application file for complete search history.

(56) References Cited

U.S. PATENT DOCUMENTS

| | | |
|---|---|---|
| 7,757,157 B1 | 7/2010 | Fukuda |
| 8,824,861 B2 * | 9/2014 | Gentile ..................... G06T 5/50 |
| | | 386/278 |
| 2002/0109710 A1 * | 8/2002 | Holtz et al. ................... 345/723 |
| 2008/0010601 A1 | 1/2008 | Dachs |
| 2013/0254129 A1 * | 9/2013 | Perlmutter ......... G06Q 10/1053 |
| | | 705/321 |

OTHER PUBLICATIONS

Japanese Office Action dated Jun. 25, 2013, issued in Japanese Patent Application No. 2012-515221.
Korean Office Action dated Jul. 24, 2013, issued in Korean Patent Application No. 10-2012-7000925.
Chinese Application No. 201080031992.4: Office Action dated Jul. 22, 2015.

\* cited by examiner

Fig. 2

Pairings (3)

| Name | John's Part | Samuel's Part | On |
|---|---|---|---|
| Pairing #1 | Me * | MASTER | 12/01/2008 9:32 AM |
| Pairing with Rob #1 | Me | robvolkel * | 12/01/2008 9:32 AM |
| Rob's Pairing | Me * | robvolkel | 12/01/2008 9:32 AM |

1 2 3 Next >

Fig. 9

New Script  |  Save Draft  |  Preview & Publish  |  Delete

1. Information    3. Lines

Script Name

[ Enter Script Name ]

Category

[ Select ]

External URL (Optional)

[ Enter URL ]    Click to Verify URL

Description (Optional)

[ Enter Description ]

Save Draft  |  Preview & Publish  |  Delete

Fig. 16

Scenes

View Only: [ My Friends (11) ▸ ]

Newest    Most Popular

▼ [ 1 ] of 3 ▲

| Scene Name | Pairings | Category | Author |
|---|---|---|---|
| Yoda says hi (3:15) | 2 | Sci-Fi & Fantasy | Jackson Lynch |
| Conversation with a borg (10:15) | 12 | Sci-Fi & Fantasy | Bruce Krysiak |
| Coffee and tourettes (30:20) | 1 | Sci-Fi & Fantasy | Michael Carp |
| Conversation with a borg (3:15) | 1 | Sci-Fi & Fantasy | Mike Bijon |
| We use elypsis when we have a long name?... | 2 | Sci-Fi & Fantasy | Eric Lee |
| Lando Croissant (10:15) | 12 | Sci-Fi & Fantasy | Sarah Richardson |
| Coffee and tourettes (30:20) | 1 | Sci-Fi & Fantasy | Rob Volkel |
| Fruits & Vegerables (30:20) | 0 | Sci-Fi & Fantasy | John Smith |

SYSTEM FOR JUXTAPOSITION OF SEPARATELY RECORDED VIDEOS

CROSS-REFERENCE TO PRIOR APPLICATIONS

The present application is a U.S. National Phase application of and claims priority from PCT/US2010/038552, filed on Jun. 14, 2010 designating the United States, which in turn was based on and claims priority from U.S. Provisional Patent Application Nos. 61/186,841, filed 13 Jun. 2009 all of which applications are incorporated herein by reference.

INTRODUCTION TO THE INVENTION

Many people have aspirations of becoming actors and "being discovered." Other people are interested in creating scripts and performing them or having them performed. These sorts of aspirations can lead to a profession or to an avocation. However, there has been a dearth of ways for an interested person to experiment with acting or scripting so as to break into this area. Traditionally, one could participate in high school performances or in amateur or "summer" theater. Yet it is clear that such avenues can be used by only a very small percentage of the people who show interest in acting or scripting.

Gradually, technology has begun to open this area. For many decades amateur actors and producers have used home movie cameras to create their own productions. Unfortunately, the process was generally cumbersome and expensive. Most home movie cameras did not include sound recording. There was a considerable delay after filming something until the developed film was returned. Home-made movies generally lacked professional editing, and it was difficult to set up a projector and "trap" an audience. Things improved somewhat with the advent of home video cameras; those devices almost universally record sound as well as image. Since there is no film to develop, a scene can be viewed instantly on a home television. The ease of viewing also makes it much easier to get an audience. Technology continues to improve so that video cameras are smaller and more powerful. At the same time software has become available allowing one to edit the recorded images, add professional titles and transitions and even convert the resulting video into a DVD for easy distribution. At the same time the Internet has expanded so that the video can be uploaded and distributed to a number of sites such as "YouTube." Today it is simple to attach a video camera to a computer (if one is not already built-in) for direct recording of video for upload. Thus, the technology for recording images and getting them to an audience has been largely revolutionized. However, the skills of acting and scripting are still in the most part acquired by trial and error.

Improvements in technology now make it possible to perform scripts of a scene, record the performance (make a "take") of one role in the scene and have it displayed in juxtaposition (a "pairing") with a second recorded performance of a second role so that it appears that the two actors recorded the scene together. While it is possible to make the takes and pairings based on the script of a well-known scene from a motion picture, television show or play (assuming that any necessary permissions had been obtained), it is also possible to create and input new scenes to enable others to create takes and pairings. Thus, budding script writers are able to hone their skills. By using a simple personal computer (or similar computing device, e.g., a game console, smart phone or tablet computer) to make the recordings which can then be uploaded to an Internet site, a huge worldwide audience is within reach. The invention enables each member of the audience to become a participant to the extent he or she wishes. Some people may choose only to view takes recorded by others and optionally make new pairings from them. Other people will get more involved; perform the scripts and record new takes of the resulting performance. Finally, some individuals will begin to submit their own scripts to see how they are accepted by the world at large.

In one embodiment, an Internet-based application allows a user to sign in to a web site to record a performance thus creating a take. For example, think of a scene between two actors (actor A and actor B) with the actors alternately speaking their respective lines. If the scene comes from a popular motion picture or the like there can be an Internet link to a video clip of the original scene so that users can view it (assuming proper permission from the clip owner is obtained). The system delivers the actors lines in a teleprompter format. The user can choose which actor to emulate (A or B). If the user decides to perform as actor A, the system will present each line to be spoken by actor A with a time progress bar indicating the speed/timing for that line. Preferably, a take of the actor B will be presented so that the user (actor A) can play off the actor B part. The take is recorded by the user's computer using a built-in camera and microphone (Macintosh & most laptops) or separate components connected to the computer. The user is able to play back the performance and rerecord it as desired. When the user is satisfied, the performance is uploaded to the website.

The teleprompter timer ensures that the user's performance is in sync with the Actor B even though the various takes are actually recorded at different times. When the user is recording his take of actor A, as he speaks his line, the system displays a prerecorded take of actor B showing actor B's reactions to the line. Then actor B performs his line and the user sees and hears that performance. During actor B's performance the image of the user (actor A) is recorded showing response to actor B. In this manner the lines alternate with actor A (the user) acting and speaking his lines for the recording and with the video take of actor B being shown with his audio being reproduced by the system. To avoid confusion in the recording, the user's local microphone is automatically muted whenever actor B speaks. The system allows the recording components to be engaged so as to visually record one person interacting with a recording alternatingly muting the microphone. This ultimately allows the takes to be played in tandem, side by side, seemingly performing together. The system communicates with a personal computing device and simultaneously orchestrates the recording of audio and video while playing back a prerecorded performance for the user to perform against. This is all done in a predefined time frame and then immediately posted in a side by side display. The result is a serving of two synchronized video streams that were originally captured asynchronously. This is made possible by use of a specific/shared time sequence imposed by means of a timing indicator (progress bar) as each line is presented teleprompter style on the local computing device.

In most cases the system will already contain multiple A and B takes for the scene. The user can decide to perform against any of the available takes. In that case the chosen recording will appear on the screen and speaks its lines in alternation with the user performing the other part. Because of the way the scene scripts are timed the A and B parts can be randomly chosen and a coherent scene (a pairing) will result. This can be used for rehearsing, audition purposes and social interaction. When the system is used to create and input new scenes, the user (or an administrator) inputs the script, broken into lines, and then performs the parts, recording of all lines to create a "master" take of each role which establishes the time frame for the performance. The master take may consist of an audio only performance. Preferably, the timing information is automatically derived from the audio of the master take. Subsequent users follow the script (with its embedded timing information) but create new takes which can subsequently be used in place of the "master" take. Any takes based on a given script including its embedded timing information (that is, on the same master take) can be combined (juxtaposed) into pairings, and the result will appear as if both performances were recorded at the same time.

It should be appreciated that while the system is described in terms of actors performing a role, there are actually several other important uses for the inventive system. The system is particularly useful in job training and HR (human resources) where the goal is to teach an individual to respond to certain situations or where it is desired to monitor an employee's or potential employee's responses. For example, imagine training a help center employee to respond to, trouble shoot and solve a variety of customer problems. In the training mode the two parts A and B would be the help center employee (A) versus the customer (B). The employee would read and perform only the employee role. The customer (B) would present real problems and would respond realistically to the employee in training. This process would be accompanied by other training exercise in which the technical problems were explored and the employee would be taught how to identify and solve the problems. The A-B role playing would give the employee realistic practice in responding to the customer. As the training progresses, the B role can become more and more variable so that the employee learns to deal with a range of problems and customer problems. Eventually, portions and then more and more of the A role teleprompter script is blanked out so that the employee learns to respond spontaneously. So that the employee learns to appreciate the customer's view, both the A role and the B role can be taken by employees in training. Finally, the invention can be used as an examination tool to gauge how well an employee has learned to deal with a given situation. Not only can the quality of the responses be evaluated, the recorded performance allows response times to be measured as another factor indicative of a trainee's skill level.

It will be further appreciated that the training use of the inventive system is not limited to the help center situation. All types of corporate training are amenable to this approach including, for example, sales. Further, the results of spontaneous responses (for example, where little or no teleprompter script is available) can be used by HR as an "automatic" interviewer, the results of which can be used to judge job candidates in a reproducible and non-prejudiced manner. This eliminates the potential bias caused by using different interviewers or by changes in an interviewer's mood from one interview to the next. In addition, the inventive system is ideal in language training both to learn vocabulary and pronunciation and to improve comprehension and response. The system is also ideal in the entertainment industry for solving the problems of casting. Prospective actors can submit A-B recordings where all the candidates perform the A part against the same B video. The casting director is then able to rapidly review a large number of candidates and quickly select a small group of finalists for the final audition. In addition, the cast director can retain the recording should future needs occur.

SHORT DESCRIPTION OF THE DRAWINGS

Figure 3:
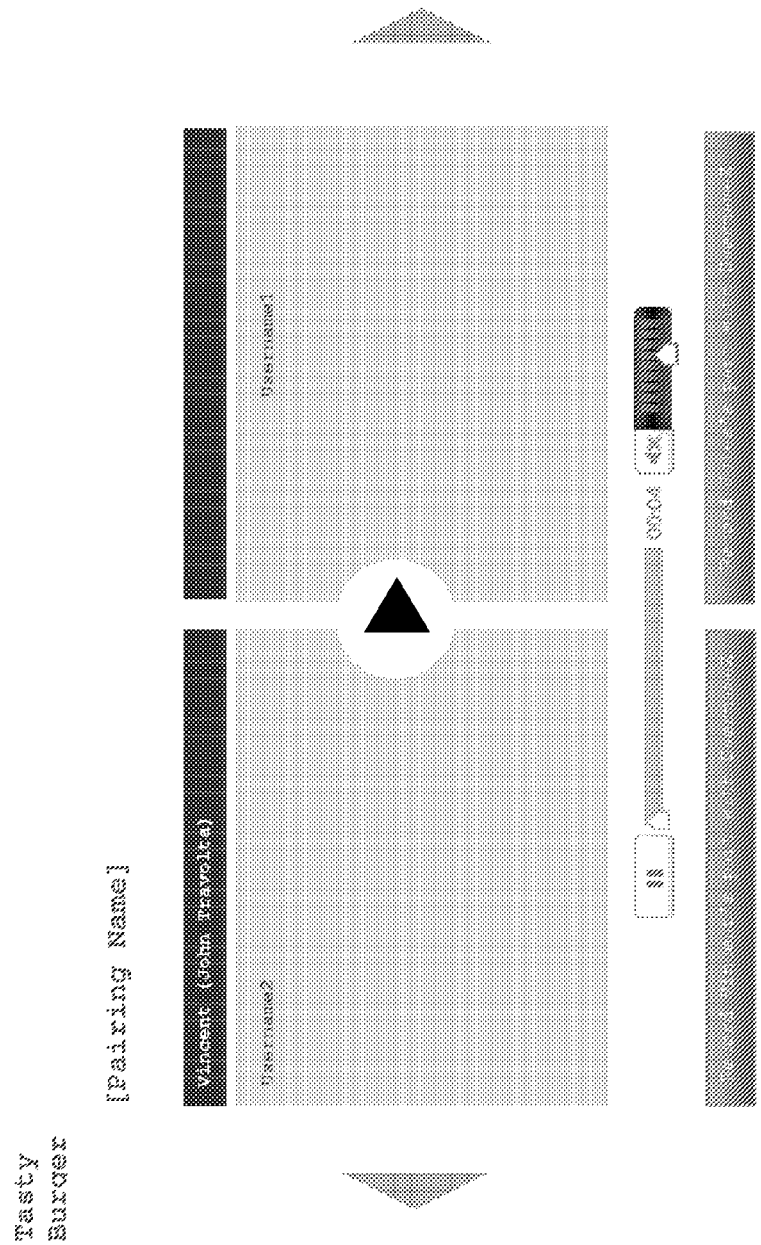
Figure 4:
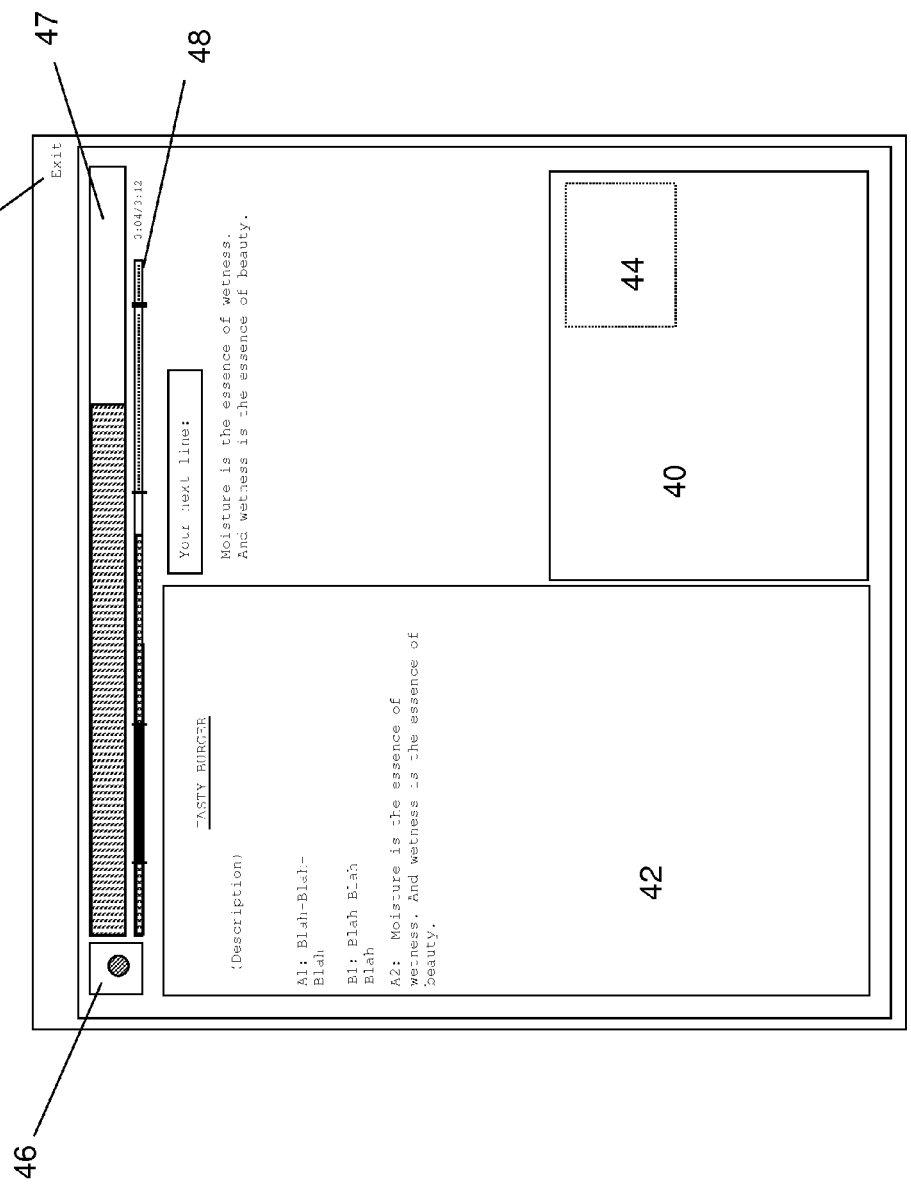
Figure 5:
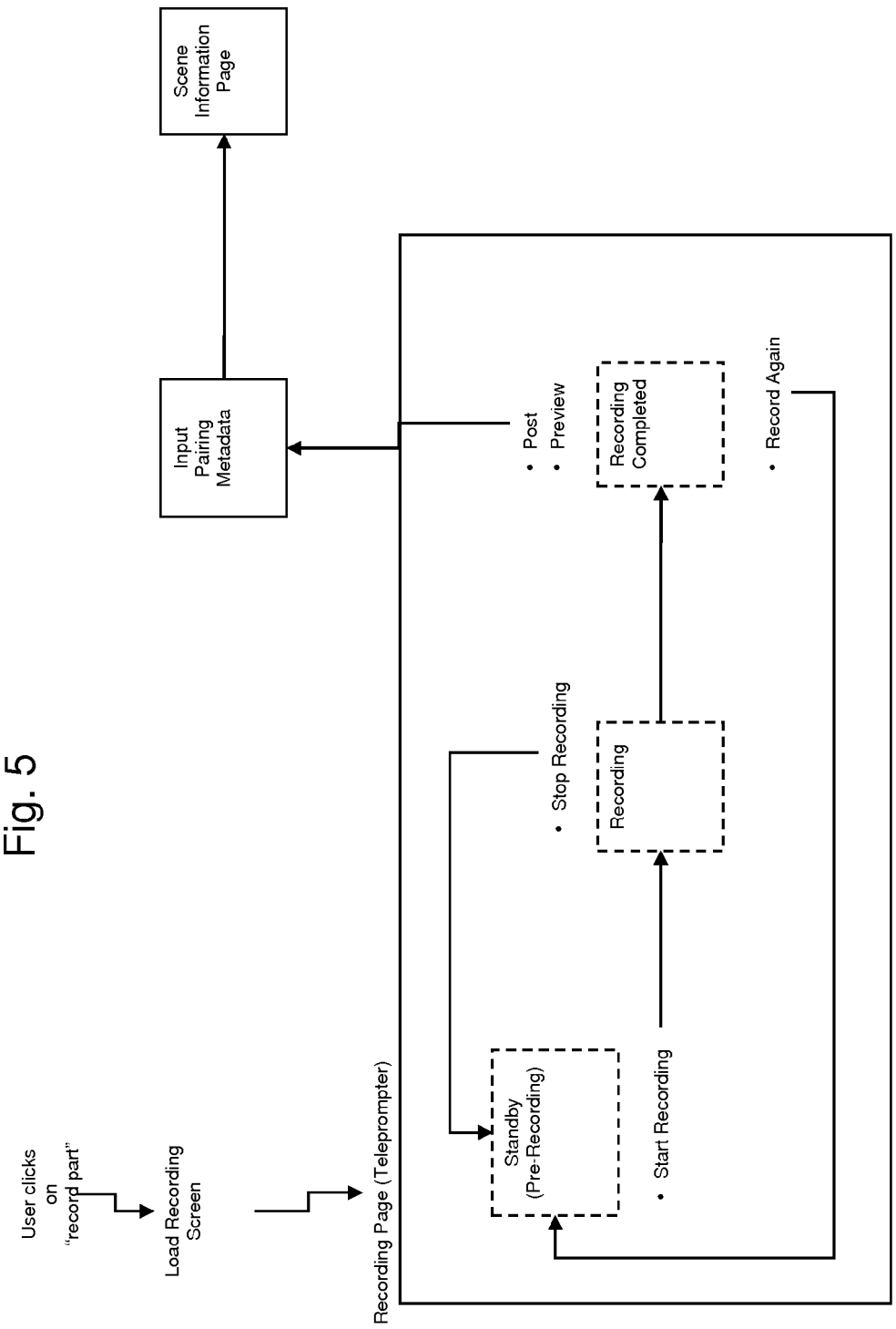
Figure 6:
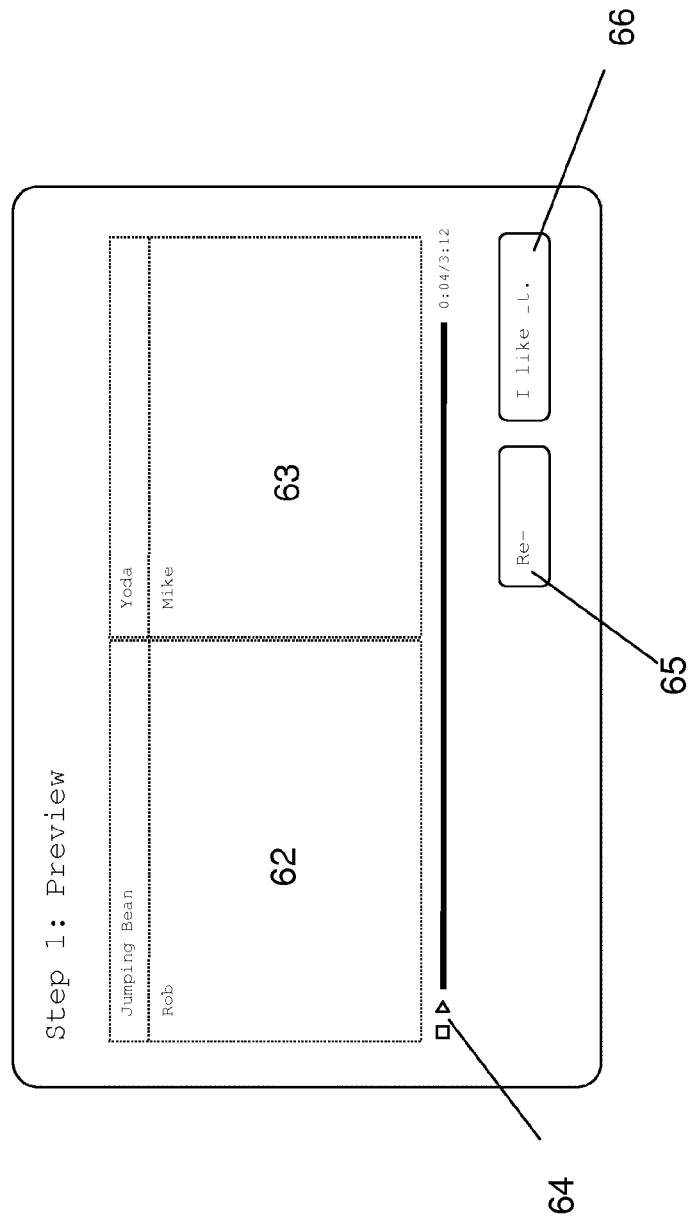
Figure 7:
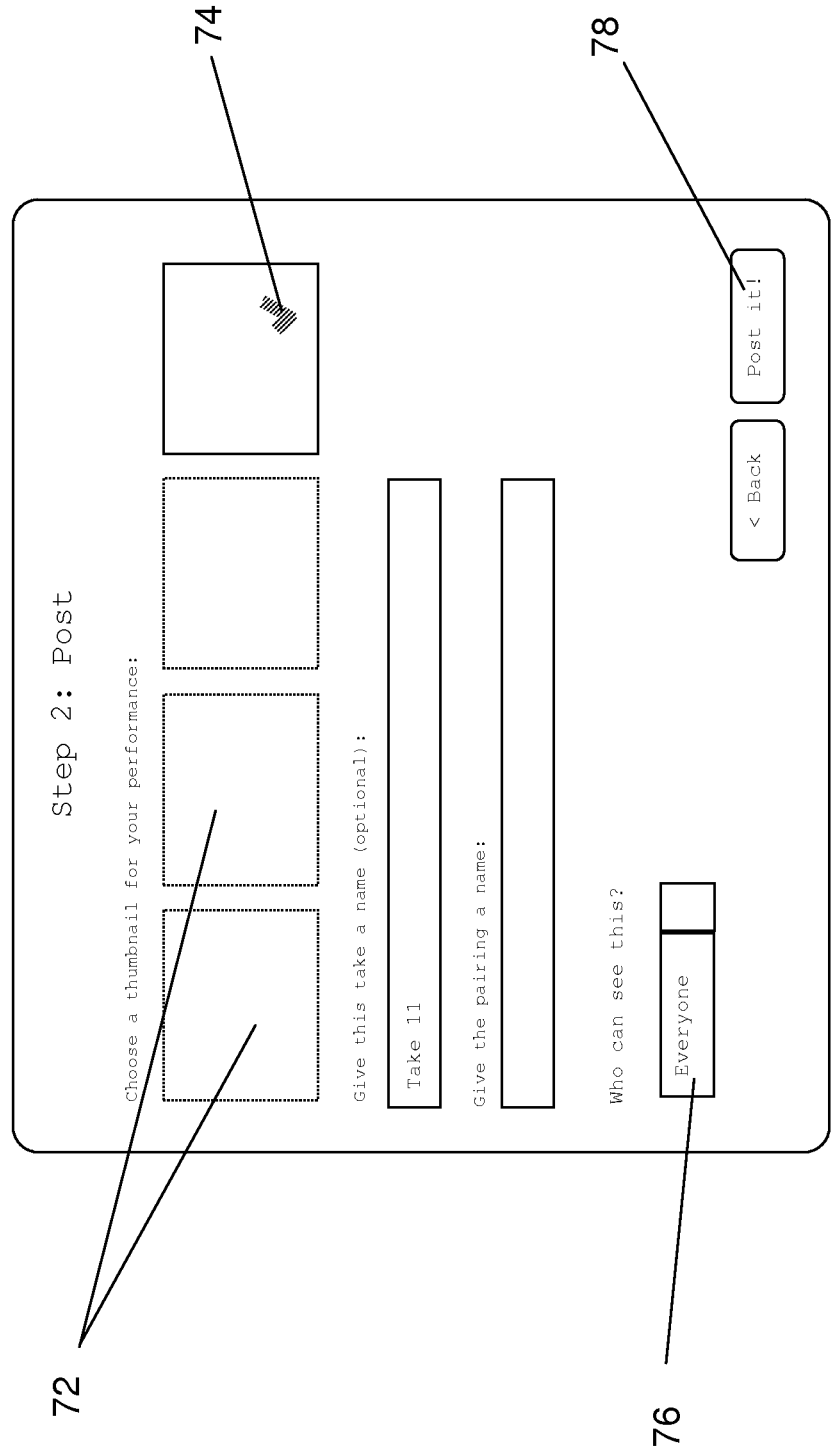
Figure 8:
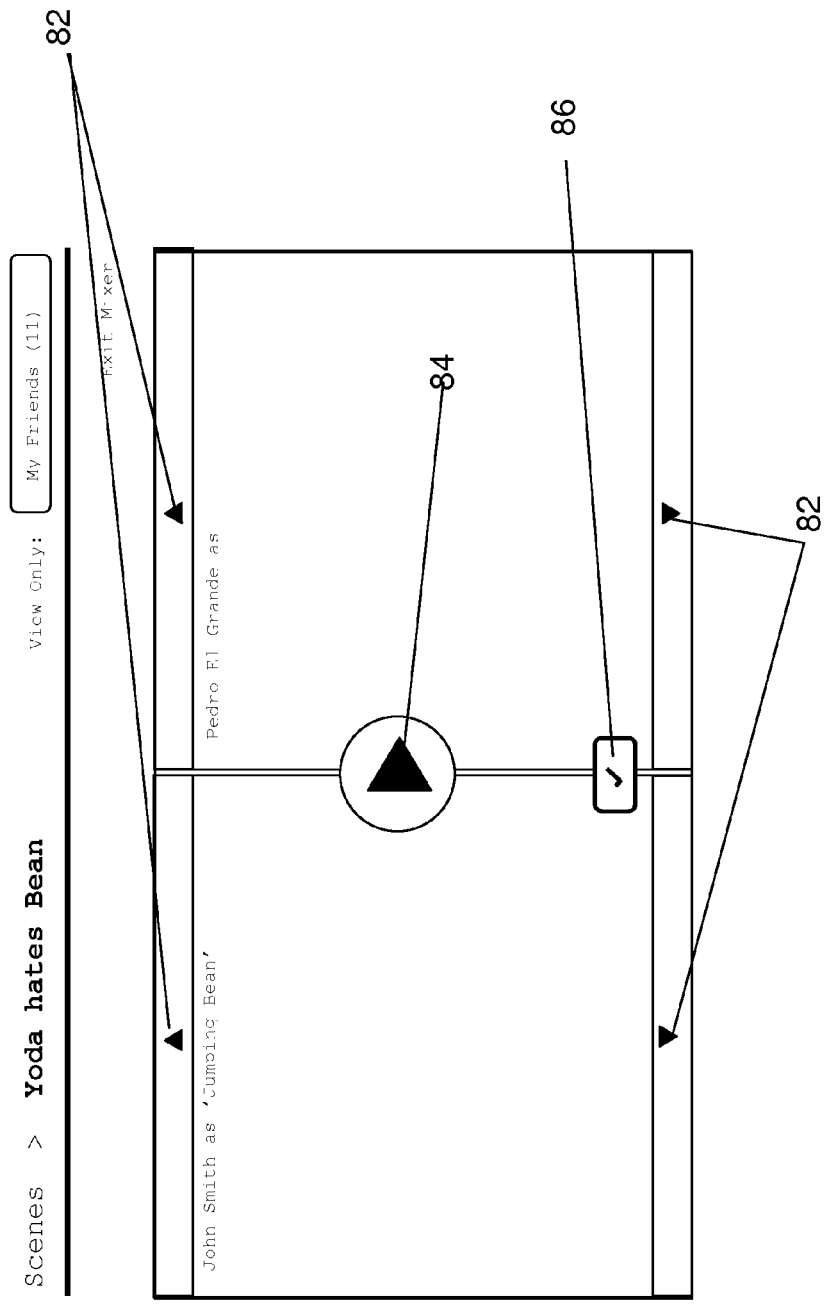
Figure 10:
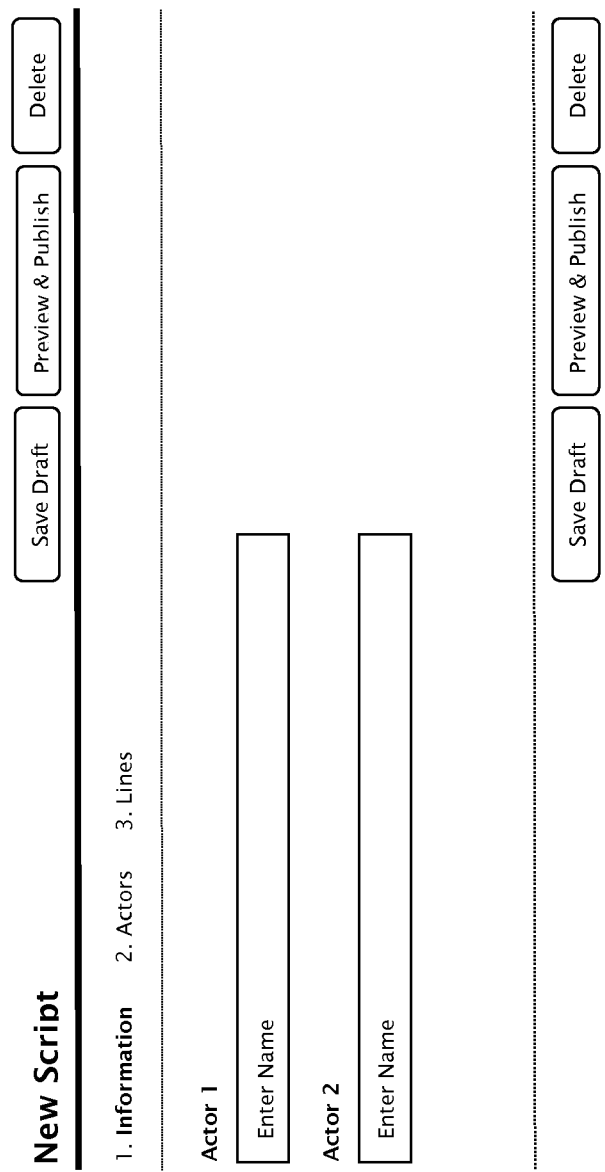
Figure 11:
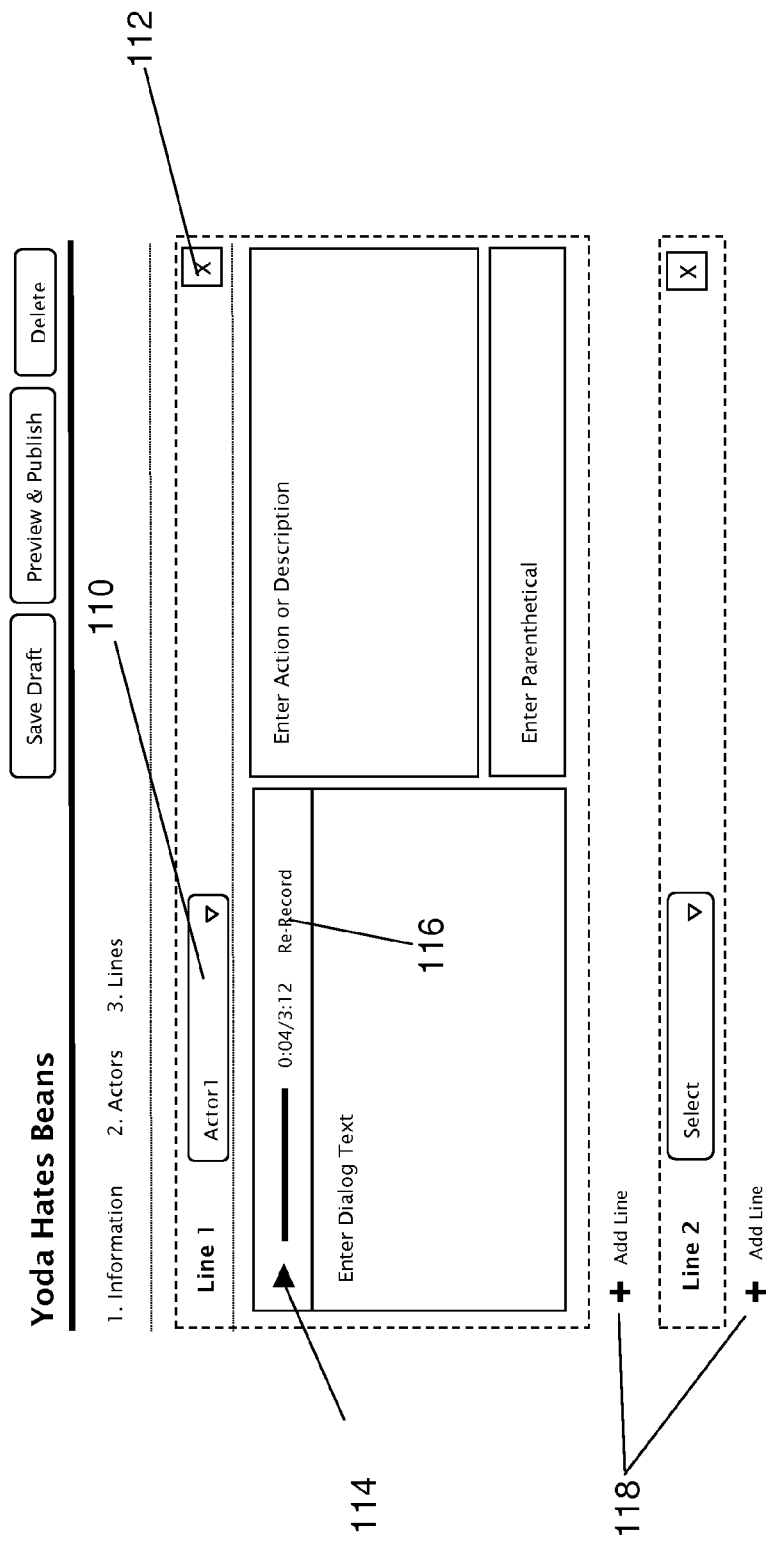
Figure 12:
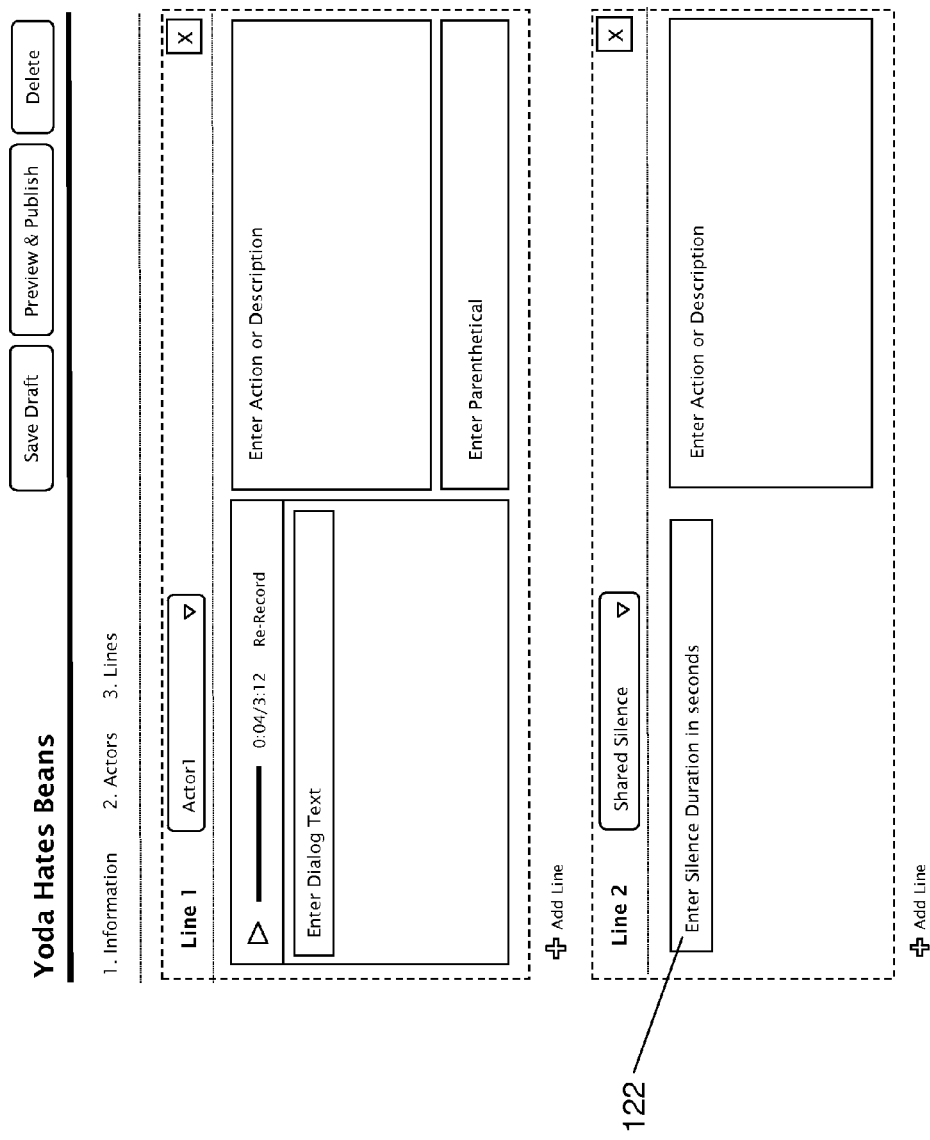
Figure 13:
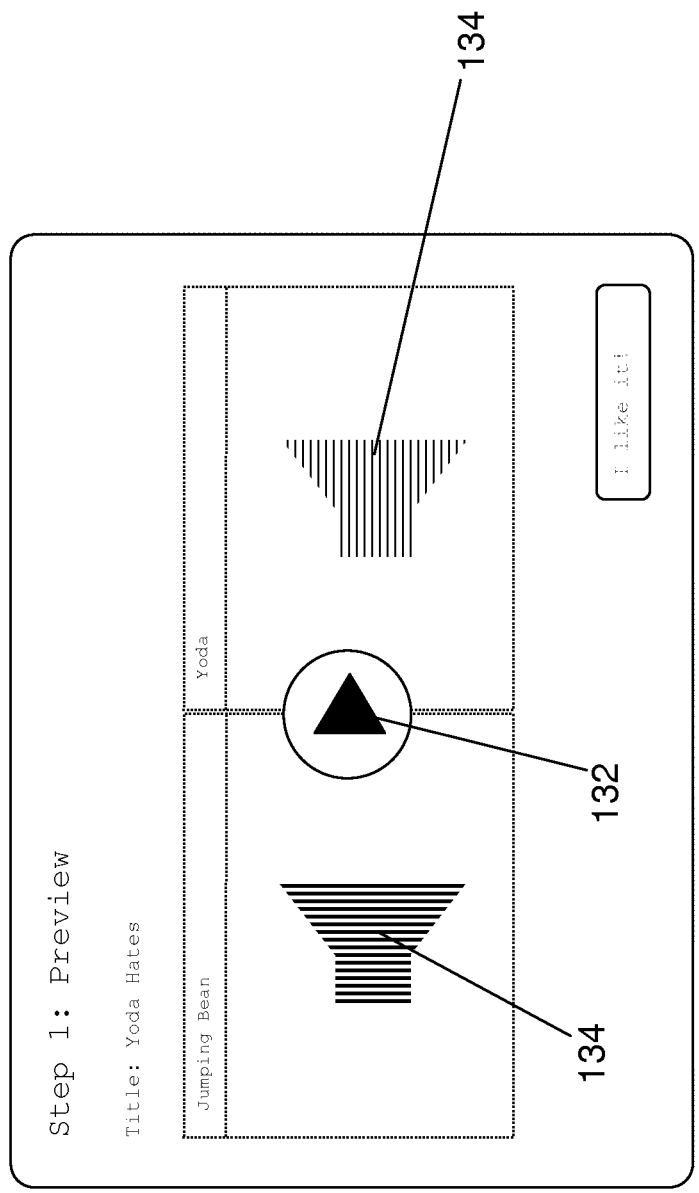
Figure 14:
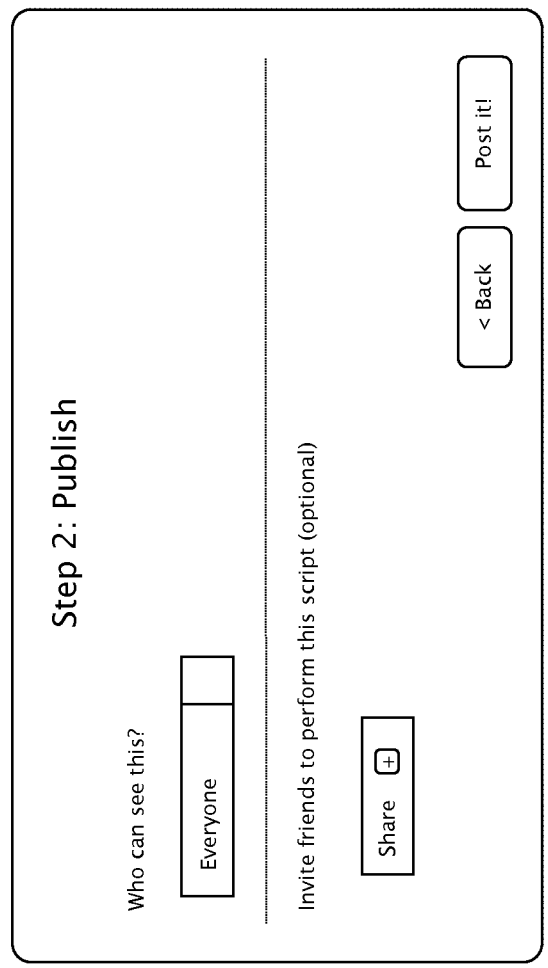
Figure 15:
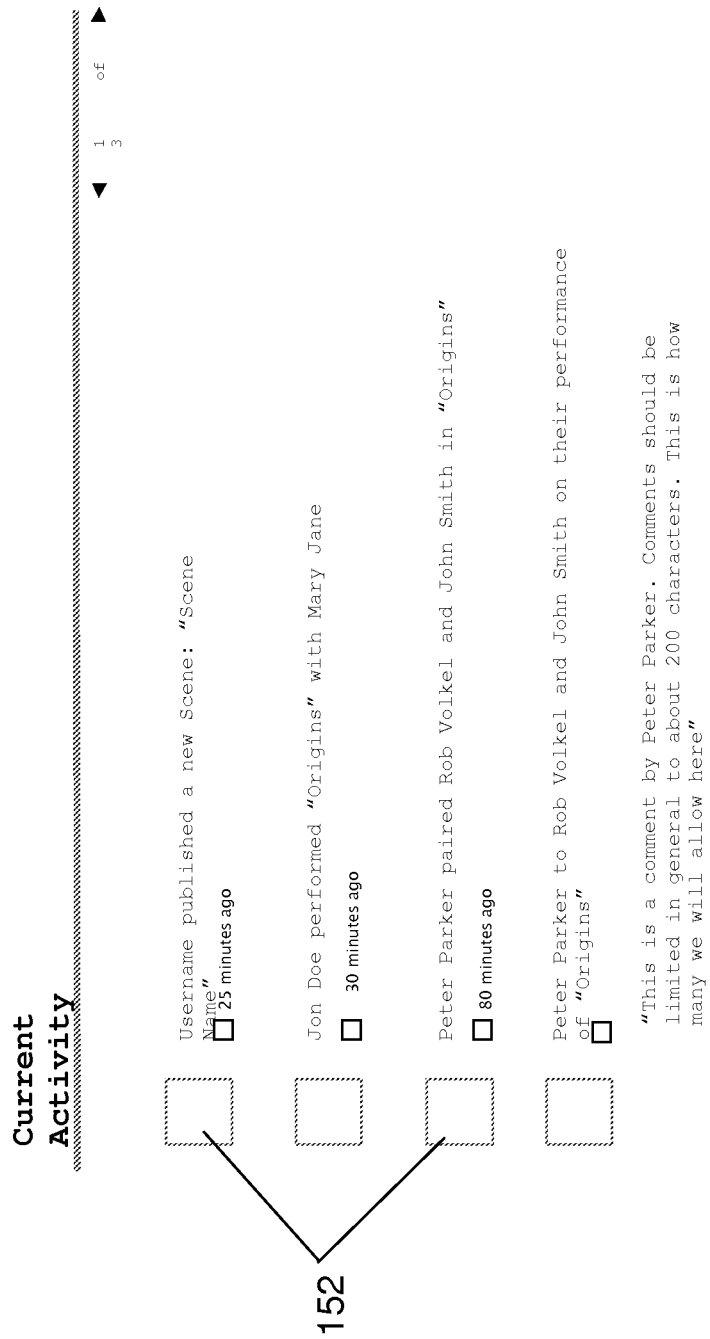

FIG. 1 is a depiction of the Scene Description screen;
FIG. 2 is a depiction Of the Pairing Listing screen;
FIG. 3 is a depiction of the Pairing Browser screen;
FIG. 4 is a depiction of the Teleprompter/Recorder screen;
FIG. 5 is a flow diagram showing the Recording logic flow for the entire system;
FIG. 6 is a depiction of the Preview Screen;
FIG. 7 is a depiction of the Thumbnail Screen-Posting screen;
FIG. 8 is a depiction of the Mixer screen;
FIG. 9 is a depiction of the New Script screen;
FIG. 10 is a depiction of the Actor screen;
FIG. 11 is a depiction of the Edit Lines screen;
FIG. 12 is a example to show the use of the Shared Silence entry;
FIG. 13 is a depiction of the Preview screen;
FIG. 14 is a depiction of the Publish screen;
FIG. 15 is a depiction of the Current Activity screen; and
FIG. 16 is a depiction of the My Scenes page.

DETAILED DESCRIPTION OF THE INVENTION

The overall process can be understood by reference to a typical implementation of this system. Those of ordinary skill in the art will appreciate that the system can be implemented in a number of different ways so that the precise appearance may differ from the examples presented here. A user enters the system by identifying himself or herself to the system. The most typical way of doing this is to input a user name and a password. The goal is to maintain security and preserve the user's privacy. Therefore, a number of other security methods such as input of biometric data could be used in lieu of or as an enhancement to a typical user name/password system. It is contemplated that the main part of the system (particularly the plurality of recorded takes) will reside on remote computers, for example in one or more databases. These remote computers or servers will be connected to the user's computer by a network such as the Internet. This includes wireless as well as wired implementations. The user's computer includes any type of networkable computing device including smart phones, touch pads and game playing stations as well as traditional desk top and lap top computers. All that is required of the computing device is the ability to access and display video (including audio) data from the network and to accept video data from a local imaging device and transmit that data to the network. Further, one of ordinary skill in the art will appreciate that the software on the user's computing device could be either a stand alone application or an application that operates within another piece of software. A particularly preferred implementation of the present system operates within a web browser that provides the display as well as the connectivity to the remote system or server. In such an implementation much of the functionality is provided by web pages constructed from any of a number of hypertext languages such as HTML or XML. Additional functionality can be provided through browser plug-ins such as Flash players and applications and applets written in meta-languages such as Java and Action Script. The application can reside as an independent web site (unique URL) or can be presented through any other web site such as popular social networking sites like "FaceBook."

Scenes. As already explained, activity within the system revolves around recording takes which are individual parts of a scene. Most scenes consist of two actors (referred to as actor 1 or A [left-hand] and actor 2 or B [right-hand], by the names of the actual actors or by the names of the characters the actors portray in the scene) although it is possible to construct a system where there are three or more actors in a scene. It will be appreciated that there is a practical limit because as more actors are added a scene becomes more confused. FIG. 1 represents a typical Scene Details screen. In this example the scene is a well-known scene from a major motion picture assuming that right to use the scene has been acquired. The scene title ("Tasty Burger) is listed along with a brief description of what transpires during the scene. Ideally, if the scene comes from a movie or vide, the actual scene is either pictured or a link to the scene elsewhere on the Internet is provided so that the user can refresh his or her memory of the original scene. In addition, script material inputted by a user into the system may be available for printing assuming no copyright problems exist.

Pairings. A link from the Scene Description screen takes the user to Pairing Listing screen (FIG. 2) which contains a full listing of available pairings derived from that scene. Alternatively, the Pairing Listing for the scene may be listed as part of the Scene Description screen (e.g., at the bottom of the screen). Where all of the pairings will not fit on a single page, a plurality of screen links (in the manner that data are presented by online search engines) can be presented to take the user to subsequent lists of available pairings. In such a case selecting (clicking on) the 1, 2, 3, Next> links allows the user to cycle through all the available pairings. "Available" indicates those pairings that a given user can view. The ability to view a given pairing can be related to "permissions" given to each user. In the simplest implementation any user can view all of the pairings for a given scene. In a more complex implementation only the pairings of ones social group and/or related groups can be viewed. In addition, the system recognizes who created a given take and pairing (the owner of the take or pairing). If the given implementation provides the ability to delete a take or pairing, this ability is related to this ownership. Generally, a user can delete only an item that was created (is owned) by that user. Permissions can be considerably more complex particularly when the invention is presented as part of a social networking site. Under those situations the owner of an item can set the permissions for that item so that it can be viewed only by the owner, only by others that are within the owner's social network (e.g., the friends of the owner), only by members of the owner's social network and related social networks (e.g., networks that have one or more common members) or by any one with access to the system. It will be appreciated that additional variations such as close friends, group members, etc. can be established in a given implementation such that the availability of various items according to the groupings.

The user can click on any of the listed pairings and be immediately taken to the Pairing Browser screen shown in FIG. 3. This screen shows the selected pairing with the actors shown in two (side by side) video windows. Selecting the play/pause button (here in the middle of the two screens) causes the system to play the pairing so that the user can see and hear the action. The videos appear in the windows below the actor's names. A Right Arrow and a Left Arrow allow the user to cycle through the available pairings (Right Arrow leading to the next pairing in the list and Left Arrow leading to the prior pairing in the list—the list may be circular). Buttons located below the pairing allow the user to record a new pairing based on either of the takes displayed in the pairing. For example, if the user selects the right hand button (Record Jules part with UserX), the user will record a new take that will pair the user (UserX will be replaced by the present user's name) as Actor B (Jackson) against Username1's take of Actor A (Travolta). Similarly, if the user selects the right hand button (Record Vincent's past with UserX), the user will record a new take that will pair the user a Actor A (Travolta) against Username2's take of Actor B (Jackson). It will be appreciated that "Username1" and "Username2" are exemplary names used only for explanation purposes. In an actual implementation the names presented will be either the actual names of the user or the "nom de screen" that a given user employs within the system. Similarly "UsernameX" will be replaced by the name of the present user.

Takes. Selecting one of the Record buttons takes the user to the Teleprompter/Recorder screen shown in FIG. 4. Assuming that the left hand (Vincent) button was selected. the take of Username2 as Actor A (Travolta) is shown in a window 40 on one side of the screen. On the other side of the screen a scrolling list 42 shows the action/description and then the actual spoken text for each actor in succession. For example, at the top of the list is the scene name with the Action/Description for the first portion of the scene. Actor A is listed with an optional Parenthetical that details the action during the following line. Then Actor A's first line of text is listed (Line A1). Following this is Action/Description for Actor B's first line (Line B1) along with the optional paragraph. This information is provided so a user can review the entire scene before actually recording. When the system is activated, this material scrolls upward so that the currently performed line is at the top of the list. Other arrangements of the material are also contemplated.

Within the video window for Actor A is located a "picture-in-picture" sub-window 44 showing a live video feed of the local user performing Actor B. System controls (e.g., stop/start button 46) are provided as well as a scrolling list that shows only the lines for Actor B. Those of ordinary skill in the art of video conferencing will understand the importance of a person looking directly into the camera. In a video conference if the participant does not look directly into the camera, the person may be perceived as lying, dishonest or reticent. This same rule generally pertains to actors; if the actor wishes to appear genuine and truthful, he or she should look directly into the camera. If the actor wishes to appear deceitful or dishonest, he or she may chose not to look directly into the camera. This brings up the importance of the placement of the script, controls and other parts of the Teleprompter/Recorder. In the example, the script for Actor B is shown above the video window, because many computer systems have the video camera (webcam) immediately at the top of the computer screen. With that camera configuration, placing the scrolling script lines below the video window may result in the actor's eyes appearing to look downward thus avoiding eye contact with the camera. With the camera located at the top of the screen, it may be advantageous to locate the script lines and controls above the video window and near the top of the screen so as to avoid downcast eyes. Similarly the picture-in-picture can also be relocated as necessary. Therefore, one of ordinary skill in the art will realize that the precise placement of the script window and other elements in this screen can and will be relocated to accommodate a particular camera configuration.

Recording a Take. The system controls include a stop/start button 46 and a time progress bar 47 which shows the time used and time remaining to speak the present line. In addition, timing notation showing the beginning time and the ending time of a given line or for the whole scene can be provided. A microphone indicator may be presented to show when recording is active. Color cues may be used to indicate status of the recording. When the microphone indicator is gray (for example), this indicates that recording has yet not started. When the recording is progressing, a red (for example) microphone indicator specifies that Actor B is speaking while a green (for example) indicator specifies that Actor A (the user) is speaking. The "microphone indicator" can be the same as the stop/go button as opposed to a separate icon. Those of skill in the art will recognize the danger of relying solely on color cues (red/green as explained above) because a significant portion of the human population is color blind and has difficulty perceiving such cues. Therefore, it is important that the indicator change in some manner that correlates with the color change. For example, where a separate microphone indicator icon is provided, the "red" icon could be supplemented with a diagonal slash, etc. One of ordinary skill in the art will understand the myriad ways the icons can be visually altered in a conspicuous way without relying exclusively on color. In addition, audio cues can be provided for users with impaired sight. The progress bar can also change color and/or pattern to indicate which actor is performing.

The progress bar 47 is provided as a graphical indication of the time remaining for a given line of the scene. For example, if the line is 31 seconds in duration, the full bar would represent 31 seconds. As time passes, the colored (or patterned) portion of the bar will increase linearly until the entire bar was filled. This allows the user to pace the delivery of a line. The progress bar is primarily for the benefit of the user recording a take; however, a progress bar can also be presented for lines in the previously recorded take (or master) against which the current take is being recorded. This helps the user get ready for the beginning of the next line to be recorded. Where two different progress bars are presented (one for Actor A and one for Actor B), the color cuing mentioned above can be used to distinguish the progress bars. Again, the problems with color perception by some users makes it useful to have the progress bar for Actor A fill with a different pattern than the progress bar for Actor B. Alternatively, the A and B bars can have different labels and/or appear in different locations. Where two progress bars are presented, it is unnecessary to provide microphone indicators or other cues to which performance is ongoing. An additional feature can be a Total Progress bar 48 that expresses the entire scene as a series of spoken lines. In the example illustrated the scene is made up of five separate lines so the Total Progress bar is divided into five segments with the length of each segment scaled to the amount of time allotted to each line. As each line is performed, the segment corresponding to that line fills in the same way as the primary progress bar fills. The same conventions concerning color/pattern coding apply. The Total Progress bar makes it very easy to see exactly where the current action is located within the scene as a whole.

The user then records a take using the tools explained immediately above. The user views and hears the prerecorded take line by line. When each of the user's lines comes up, the user reads the displayed line keeping within the timing constraints provided by the Progress Bar 47. As the user performs, the user is able to view his or her performance in the Picture-in-Picture window 44 and can modify the performance accordingly. At any time the user may decide to abandon the take by clicking the exit button 49. In a preferred embodiment this action erases all of the take that has been recorded up to that point and resets the scene to its beginning. In an alternative embodiment, this action merely erases the current line and resets the process to the beginning of the current line. In that circumstance selecting the record button will start the process at the beginning of the current line. Whether stopping the take erases all or only the current line may be selectable as a preference or may be available through specific control buttons on each Teleprompter/Recorder screen. FIG. 5 shows a logic flow diagram that explains how the various tasks involved in recording a take are related.

Preview/Publish New Takes. When the user completes recording the take, the user is taken to a Preview Screen (FIG. 6) where the two parts (Actor A and Actor B) are displayed as side by side windows—62 for actor A and 63 for actor B. The user is able to view the newly created pairing by pressing the play button 64. After reviewing the pairing, the user can either rerecord (button 65) the take or if the user is satisfied with the take, the user can save and upload the newly created pairing by selecting "I like it" 66. If the user elects to save the take, a Posting Screen (FIG. 7) is presented. This screen allows the user to name both the take and the pairing. The user may also be allowed to provide comments or other information concerning the take. The user may also be presented with a choice of thumbnail snapshots to use with the pairing (these would be visible along with the name of the pairing in the Pairing Listing screen). The thumbnail snapshots 72 are automatically extracted from the video stream during the recording process at time intervals controlled by the system. For example, if there are four thumbnails presented, the system could extract the thumbnail video frames at T=0 (start of the take), T=1/3 of the take, T=2/3 of the take or T=3/3 (end of the take). One of ordinary skill in the art will recognize that a number of other mechanisms can be provided to create thumbnails. For example, on the Preview Screen a button can be provided that allows the user to create a thumbnail image at any point in the take. When the user selects the thumbnail button, a thumbnail is created from the then displayed video frame and appears on the screen. The user can replay the Preview Screen repeatedly until a perfect thumbnail is created. The preferred thumbnail is selected by clicking on it (the check mark 74 indicates that this thumbnail has been selected).

If the given implementation contains additional permission options (as in the social networking implementations mentioned above), the Posting Screen may contain selectable settings 76 that control who is able to view the new pairing. Finally, if the user is satisfied, the user selects "Post It! 78 and the new pairing is uploaded to the Internet database. The new pairing may be immediately viewable on Preview Screens of other users who satisfy the permission properties (if any) of the new pairing. Alternatively, there may be administrative screening (explained below) that delays widespread availability of a new take.

According to the above explanation a user is able to create new pairings by recording a new take against one of the takes in an available pairing. Because of the unique way that each take is governed by the timing information built into the underlying script, the new pairing will play as if the two takes making up the pairing were recorded at the same time. This ability to juxtapose takes enables a second way of creating a pairing. FIG. 8 shows the Mixer screen. This screen resembles the Pairing Preview screen except that the controls do not move from pairing to pairing. Instead the controls 82 enable the user to move from available take to available take for a particular scene. Because all the takes for a given scene share the same underlying master with its inherent timing information any A actor take can be combined with any B actor take to produce a coherent pairing (so long as all the takes are performed against the same master pair or against other takes performed against that master pair). The Mixer screen enables the user to cycle through the available A actor and B actor takes based on the same masters and test each new pairing by selecting the play button 84. The available takes may be listed chronologically or according to other criteria which can be user selectable. If the implementation includes a variety of permission settings, the available takes can be filtered according to such settings. For example, the user could chose to view only takes by immediate friends or takes by some other grouping. Once the user has created a new pairing, it is possible to save that pairing by selecting a "save pairing" button 86. This can result in the user being taken to a screen identical or similar to the Preview Screen where the pairing is named and thumbnails selected, etc. If the new pairing is satisfactory, the user can post the pairing to the site. In this case since all of the takes already exist in the databases, only the pairing and thumbnail information are uploaded. Should the user manipulate the Mixer so as to select two takes that are already in a pairing, the "save pairing" button is not active and the page may also display an message or symbol indicating that the particular pairing already exists and cannot be saved a second time. Alternatively, the system may be designed so that preexisting pairings cannot be displayed in the Mixer.

Scripts. One of the most important features of the system is the ability to readily input new scripts thereby creating new scenes for users to record takes and create pairings. Significantly, the input process automatically establishes the script timing properties that enable free juxtaposition of takes. To input a new script the user goes to the New Script screen (FIG. 9). The user enters a name for the script and selects a category for the script. Table 1 shows a potential list of script categories (i.e., script genres); these categories enable other users to readily search for scenes of interest. The user can also input a URL for a web location where a video performance of the script is located. This is useful where the script is derived from an already existing play, video or motion picture. The user then can enter a description of the script. Normally this would summarize the action taking place and also furnish important background information useful in performing a take based on the script. The user can then chose to "Save Draft," "Preview & Publish," or "Delete." If the user chooses Save Draft, the information is saved and the user is taken to an Actor screen (FIG. 10). It is not possible to Preview the script until at least two lines have been entered. Once the draft has been saved, it is possible to quit the system and come back at a later time to continue working on the script. On the Actor screen, the names of the actors are entered. Generally, the names used will be those of the characters in the script (as opposed to real actor names although optional entry for the actor's real names—as in a script from a motion picture—can readily be provided). When the actor names are saved (Save Draft), the user is taken to an "Edit Lines" screen (FIG. 11).

TABLE 1

| | Script/Scene Categories |
|---|---|
| 1. | Drama |
| 2. | Comedy: Romantic, Spoof/Parody |
| 3. | Sci-Fi & Fantasy |
| 4. | Action & Adventure |
| 5. | Kids & Family |
| 6. | Mystery & Suspense |
| 7. | Musical |
| 8. | Horror |
| 9. | Western |
| 10. | War |
| 11. | Sports |
| 12. | Documentary |
| 13. | Other |

The Edit Lines screen allows the user to enter a script one line at a time. For each line added the user selects either Actor A, Actor B or Shared Silence (e.g., from a drop down box 110). If one of the actors is chosen a Dialog Text box for entering the actual line appears; there is also a box for inputting a description of the action that accompanies the line and a box for entering a "parenthetical"—additional information concerning the line such as "whispered." There is also a button 112 for removing the line (in case the line was entered in error or in the wrong sequence). Although all the lines can be added before any of the lines are recorded, it is also possible to press the "record" button 114 and record the line. At the completion of the line the user presses a "stop" button (may be the same button 114) to indicate that the recording is complete. When a line is recorded, the system determines the actual duration of the recorded audio (time elapsed between pressing the "record" button and the "stop" button) and this information is subsequently used to control the progress bar when takes are being recorded—thereby ensuring that all the takes recorded from the same script will be interchangeable. Duration could also be determined by the system by detecting silence at the completion of a line. After the line is recorded, the user can listen to the recording (the record button acts a "play" button) and rerecord it if desired (button 116).

At any time an addition line can be added any where within the script by selecting one of the add line buttons 118. If "Shared Silence" is selected from the dropdown box, a different entry structure is used (FIG. 12). There is a box for a description (Action or Description) plus a space 122 to explicitly enter the duration of the silence in minutes and seconds—this is necessary because there is not way for the system to automatically determine the duration. Other types of lines can also be implemented in different embodiments of the system. For example, in addition to "Shared Silence" one can also have "Shared Lines" where the actors speak simultaneously. Such lines are recorded separately for each actor but when a pairing is played, the audio tracks overlap. This possible because the system records a complete video of the entire scene for each actor. However, the audio track is manipulated by the system so that audio is recorded only for that portion of the scene where the given actor is speaking. Normally, the audio parts alternate, but it is a simple modification for the audio tracks to overlap—that is for the actors to speak simultaneously.

After all the lines have been entered and recorded, the user can preview the audio for the entire script as shown in FIG. 13. The two parts are shown side by side much like the Preview Screen for pairings except that no video image is available. When the "play" button 132 is selected, the lines are played sequentially and an indicator identifies 134 (a loudspeaker symbol is used to indicate an audio only master) which of the two actors is speaking. The color/pattern or the indicator changes as was discussed above in relation to the Teleprompter screen. If this Preview shows that the script still needs work (e.g., the timing between the lines is not optimal), the user can go back and edit the script and/or rerecord some or all of the lines. When the Preview results are satisfactory, the user is able to finalize and publish the script. The Publish screen (FIG. 14) allows the user to add permissions (which control who can see the script and create takes based on the script) to the extent that the particular implementation includes such permission control features. It is also possible automatically to send notices to others drawing their attention to the new script ("Share"). Finally, selecting "Post it" causes the newly created script to be uploaded to the database where it becomes available to other users (pending any administrative function the system may implement).

Current Activity (aka "Feed"). An important aspect of the system is the potential for social interaction. For example, the system can present each user with a "Current Activity" page (FIG. 15). This page, for example, would list all the recent pairings and takes based on a script entered (owned) by the current user. If the implementation allows other users to post comments concerning takes or pairings, such comments concerning takes and pairings of the current user will appear on this page. The system might also allow other users to send comments or messages to the owner of a take or pairing—such messages would appear on the Current Activity page. Thumbnail images 152 are representations of the user whose recent activity is recorded. The system might also allow users to vote on the best pairings and takes or to rate the pairings and takes—these results would be listed. The system might also automatically compute a "popularity" index for a take or pairing or scene. For example, such a calculation for a scene could be based on the number of pairing created for the scene, the number of times a scene is viewed, the number of comments made about the scene and the overall ratings for the scene. Generally a timing factor would be included to adjust for the fact that a scene that had been around for a long period of time would naturally accumulate a large number of pairings and comments. However a winning scene would accumulate a larger number of comments and pairings per unit time. It will be appreciated that the factors and the weight of the factors used to calculate a popularity index can be readily changed and adjusted to meet various conditions. It will also be appreciated that the contents of the "Current Activity" page depend on the permission model implemented in a given embodiment. For example, the Current Activity might include all of the pairings, etc. that pertained to the user's social group (e.g., friends) or those belonging to higher level social networks. The user can be allowed to set the level of "filtration" so that the Current Activity would, for example, pertain to pairings involving friends or pairings involving friends of friends. Current Activity would be essentially evanescent—that is only recent information would be displayed and after a defined period of time had elapsed, that information would be replaced by more recent information. Filtration of the current activity makes it easy for the user to either maintain his or her total privacy and be private or to go public in an elastic manner that allows as much publicity as one wishes.

My Scenes. Additional ways can be provided for users to keep track of system events involving their scenes, pairings or takes. For example, if a user is the owner of a scene (i.e., input the original script for a scene), the user could have access to a "My Scenes" page (FIG. 16) that would include all the information related to that scene—all the takes, pairings, comments, ratings, etc. Unlike the Current Activity the information would be archival and go back to the initial publishing of the scene. Similarly, the user could have access to "My Performances" which would show those takes recorded by the user including all pairings directly based on those takes, ratings, comments, etc. It is also possible to expand the relationship to view the information related to takes based on the user's take (second generation relationship) or takes based on second generation takes (third generation relationship), etc. provided the permission system in use allows such access. It will be appreciated that an actor would wish to view the progeny of his or her performance as well as the children of that progeny, etc.

Removal of Material. Generally, the owner of a script, take or pairing has the power to remove (i.e., delete) that script, take or pairing from the system. Conversely, only the owner is normally allowed to delete an item (but see "Administrative Functions," below). The exact consequences of a deletion can be handled in different ways depending on what is being deleted. For example, if a pairing is deleted, the association between two different takes (along with associated comments, etc.) would be removed but the underlying takes would remain. If a given take is deleted by its owner, that take and all associated comments and pairing associations would be removed. To preserve takes that were created to pair with the deleted take, the Master take for the deleted take would be substituted into all the involved pairings. Deleting a script is somewhat more complex because takes based on a script contain the creative work of both the script owner and the actor who created a given take. One possibility would be to simply delete all takes made from a script when the script is deleted. An alternative that preserves the creative work of each actor would be to preserve an actor's ownership and access to his or her takes even when the script had been deleted. However, these takes would no longer be available publically in the system.

Administrative Functions. The system has been described as being solely under the control of the users. However, in real life the system requires Administrative or Supervisory Functions. Special administrative users would be allowed to observe and control the system. Generally, the administrative users would have special accounts which provided them with access and control not available to ordinary users. This concept is common to virtually all information technology systems. Such control might be necessary to prevent or ameliorate abusive, illegal or obscene use of the system. The system operates under a User Agreement that clearly defines those activities that are not permissible. Where a complaint has been received or where routine monitoring of the system indicated a problem, the administrative user could enter the system and remove the problematic material or even remove a particular user who was violating the User Agreement. Generally, scripts entered into the system would be either the personal creation of the user or in the public domain. Where a third party complained that a given script was a copyright infringement, the administrative user would investigate the allegation (according to procedures clearly spelled out in the User Agreement) and delete the script if it were found to be a copyright infringement. Similarly where it was alleged that a script or take was obscene (or violated the User Agreement in some other way), an administrative investigation would resolve the allegation. Although the description given above suggests that a completed script would be directly published to the system, an alternative approach would allow for administrative review of each script to weed out obviously offensive material prior to system publication. If the script was determined to be compliant with the User Agreement, it would receive immediate general posting. If a problem were discovered, the problem could be discussed with the posting user to see if an acceptable solution could be developed. Administrative users could also enter and publish new scripts, correct broken hyperlinks and deal with other malfunctions in the system.

System Implementation. As mentioned above, a variety of different software systems can be used to implement the present invention. A preferred embodiment operates through a web browser with specialized features provided by third party scriptable software that implements the advanced features. The camera (webcam) attached to the users computing device records webcam videos by means of Flash Media Server (FMS), a product of Adobe Systems Inc. (San Jose, Calif.). In short, the stream from the webcam (which encompasses video as well as audio as delivered by Adobe webcam software and the local computer operating software) is intercepted by the Flash browser plug-in feature in one of three custom programs or applications (Teleprompter, Playback and Script Audio) that form part of the inventive system. Each of these custom programs is created from Adobe software components which are controlled (programmed) by means of ActionScript (a proprietary Adobe meta-language). Each custom program is automatically downloaded form a web server when the user views the appropriate web page, and the custom program operates on the user's computing device inside the web browser program by means of the Flash browser plug-in. The Teleprompter program provides the record and playback controls for recording a take. The Playback program provides playback controls for playing a pairing. The Script Audio program provides record and playback controls for recording the audio master for a script. Each of the custom programs is responsible for compressing and conditioning the data stream and transmitting it (by means of the Internet) to a dedicated FMS server for storage.

Every recording, whether audio (from the Script Audio program in the script authoring tool) or video (from the Teleprompter program) is automatically named with a unique file name. Methods for constructing unique file names are well known to those of ordinary skill in the art. One method is to combine the user name (which is unique in the system) with a string constructed from the date and time of the recording. That file name is also saved into a database located on a server in communication with the web server along with data about the user and scene (e.g., the data input through screens shown in FIGS. 4-7). When the user seeks to playback a video or audio file, a different Flash program receives the data to be played from the web server via the web browser. The server knows which file to transmit from the database, based on variables in the URL (uniform resource locator) sent by the web browser. The data include the unique filename of the video, so the Flash playback program operating in the user's browser asks the FMS server for the correct file.

Although the operation of the system described above makes it appear that the camera and microphone are turned on and off at the correct time, the system doesn't actually control the microphone and camera at all. Effectively, when the user uses the inventive system through the web page, the user gives the custom Flash application permission to access the user's data (the audio and video data to be recorded) compress the data and transmits the data continuously. The inventive system "begins" and "stops" recording based on on-screen controls or indicators that the custom Flash application shows to the user. When these controls are operated, a command is sent to the FMS server causing it to start and stop recording of a portion of the continuously streamed data. The end result is that the camera and microphone appear to turn on and off because the only part of the streamed data recorded by the FMS server is that portion falling between the operation of the "begin" and "stop" recording control. The data stream is sent to the FMS server via an "FMS connection" that's maintained when the Flash program first opens and continues until the application is explicitly closed or until the user navigates to another web page. If there's no Internet connection and/or no FMS server connection available, then the custom Flash program will attempt to connect indefinitely before playing or recording anything.

The custom Flash program decides when to end the connection based on a time value from the database, or via a user-selectable control shown on the user's screen. The data stream sent to the FMS server is compressed according to settings in a custom FMS server application and compression schemes built-in to the FMS server itself. The system typically discards "no video" audio streams, so custom programs belonging to the inventive keep audio only streams open (because time and length are important to the system to ensure interchangeability of takes based on the same script). Video is simply recorded for the whole duration of the scene (or user-allowed time, but not longer than the scene duration) and neither the system nor FMS does any detection of what's in the video (e.g., no determination that black screen=no data).

All three of the custom applications are based on standard FMS components and features. Those of ordinary skill in the art will appreciate that there are other ways to achieve similar results using Flash in the browser and custom server-side programs (i.e., without FMS), as well as by using recording tools from Microsoft (Silverlight server+Silverlight in-browser) and Apple (ASPL+QuickTime in-browser), or via open source software such as Red5 media server or "FFmpeg" which both use Flash in-browser. Similarly, non-browser implementations can be readily achieved by custom programming or by combining available software components. An "Adobe Air" application can be used to enable local storage of the videos without streaming everything over the Internet. However, since the preferred implementation of the inventive system uses web pages delivered by Internet, an in-browser software approach such as that just detailed is generally the most direct solution.

The following claims are thus to be understood to include what is specifically illustrated and described above, what is conceptually equivalent, what can be obviously substituted and also what incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method for allowing an initial role-player to select a recorded audiovisual take of a role in order for the initial role-player to record an initial audiovisual take of a different role that is juxtaposable with the recorded audiovisual take, so as to create a video scene that appears to have been recorded in its entirety at one time, and wherein a subsequent role-player can select the recorded audiovisual take in order for the subsequent role-player to record a subsequent audiovisual take of the different role, and interchange the initial audiovisual take of the video scene with the subsequent audiovisual take, so as to create a new video scene, the method comprising the steps of:
  providing an Internet-connected server storing a database containing a first video scene,
    wherein the first video scene contains a previously-recorded audiovisual take of a first role and a previously-recorded audiovisual take of a second role,
    wherein the first role and the second role are from a written script with at least two roles, and
    wherein the duration of each line of each audiovisual take of the at least two roles is governed by master timing information built into the written script, such that all audiovisual takes of the first role governed by the master timing information are interchangeable, and all audiovisual takes of the second role governed by the master timing information are juxtaposable with all audiovisual takes of the first role;
  providing a first Internet-connected computing device, including audiovisual recording and display devices, that enables a first-generation role-player:
    to download and to display audiovisual takes from the database;
    to record a first-generation audiovisual take of the first role while viewing and responding to the previously-recorded audiovisual take of the second role;
    to create a second video scene by interchanging, in the first video scene, the previously-recorded audiovisual take of the first role with the first-generation audiovisual take; and
    to upload to the database the second video scene,
    wherein the duration of each line of the first-generation audiovisual take is determined by the master timing information;
  providing a second Internet-connected computing device, including audiovisual recording and display devices, that enables a second generation role-player:
    to download and to display audiovisual takes from the database;
    to record a second-generation audiovisual take of the second role while viewing and responding to either the previously-recorded audiovisual take of the first role or the first-generation audiovisual take;
    to create a third video scene by interchanging, in either the first video scene or the second video scene, the previously-recorded audiovisual take of the second role with the second-generation audiovisual take; and
    to upload to the database the third video scene,
    wherein the duration of each line of the second-generation audiovisual take is determined by the master timing information;
  providing a third Internet-connected computing device, including audiovisual recording and display devices, that enables a third generation role-player:
    to download and to display audiovisual takes from the database;
    to record a third-generation audiovisual take of the first role while viewing and responding to an audiovisual take of either the previously-recorded audiovisual take of the second role or the second-generation audiovisual take,
    to create a fourth video scene by interchanging, in either the first video scene, the second video scene or the third video scene, the previously-recorded audiovisual take of the first role or the first-generation audiovisual take, respectively, with the third-generation audiovisual take; and
    to upload to the database the fourth video scene, wherein the duration of each line of the third-generation audiovisual take is determined by the master timing information.

2. The method according to claim 1 wherein creation of the first video scene comprises the following steps:
  receiving input of each line of the at least two roles of the written script from a user;
  determining a master duration of each line;
  creating a juxtaposable, interchangeable audiovisual take of each of the at least two roles by:
  displaying, in synchrony with a performance by the user of each line of the at least two roles being performed:
    a text of each line being performed, and
    an indicator of time remaining of each line being performed, wherein the time remaining of each line is determined by the corresponding master duration;
  recording audio-visually the performance of the user; and
  for each of the at least two roles of the written script, combining an audiovisual recording of each line of the at least two roles; and
  juxtaposing the audiovisual take of each role of the written script to create a video scene.

3. The method according to claim 1, further comprising the step of muting, while recording a performance of a user, a local microphone of the user whenever there are no spoken lines for the user.

4. The method according to claim 1, wherein other generations of role-players can precede the first generation of role-players, such that the second video scene can be considered, relative to these preceding generations, a third or fourth video scene, and the first Internet-connected computing device can be considered, relative to these preceding generations, a second or third Internet-connected computing device; and wherein other generations of role-players can follow the third generation of role-players, such that the fourth video scene can be considered, relative to these following generations, a second or third video scene, and the fourth Internet-connected computing device can be considered, relative to these following generations, a first or second Internet-connected computing device.

5. A method for creating a video scene comprised of juxtaposable and interchangeable audiovisual takes of a written script, the method comprising the steps of:
  selecting a first video scene comprised of juxtaposable and interchangeable audiovisual takes of a written script,
  wherein the written script has at least two roles;
  wherein the first video scene contains an audiovisual take of each role of the written script; and
  wherein the duration of each line of each audiovisual take of the at least two roles of the written script is governed by timing information built into the written script, such that:
    all audiovisual takes of a first role of the written script are interchangeable, and
    all audiovisual takes of a second role of the written script are juxtaposable with all audiovisual takes of the first role of the written script;
  selecting from the first video scene a selected audiovisual take of either the first or the second role; and interchanging the selected audiovisual take of either the first or the second role with a second audiovisual take of either the first or the second role, respectively, wherein each line of the second audiovisual take shares a duration with each corresponding line of the selected audiovisual take, so as to create a second video scene.

6. The method in claim 2 wherein the master duration of each line is determined automatically.

7. The method in claim 1 wherein the first generation role-player records the first-generation audiovisual take by:
   displaying on a screen, in synchrony with a performance by the first generation role-player of each line of the first role:
      a text of each line being performed by the first generation role-player,
      an indicator of time remaining of each line being performed,
      another audiovisual take of another role of the written script, and
      a live video feed of the first generation role-player performing the first role; and
   recording audio-visually the performance by the first generation role-player.

8. The method in claim 7 further comprising a step wherein the first generation role-player changes a placement of an element displayed on the screen.

9. The method in claim 7 wherein a portion of the text displayed on the screen is blanked out.

10. The method in claim 7 further comprising a step wherein a thumbnail snapshot is automatically extracted from the live video stream.

11. The method in claim 5 further comprising a step wherein a user accesses audiovisual data from an Internet-connected server by identifying himself or herself to the Internet-connected server.

12. The method in claim 5 further comprising a step wherein a user controls an ability of another user to view audiovisual data.

13. The method in claim 5 further comprising a step wherein a user posts a comment relating to either the first video scene or to the selected audiovisual take of either the first or the second role.

14. The method in claim 5 further comprising a step wherein a user sends a message to another user relating to either the first video scene or to the selected audiovisual take of either the first or the second role.

15. The method in claim 5 further comprising a step wherein a user, based on a criterion, rates either the first video scene or the selected audiovisual take of either the first or the second role.

16. The method in claim 5 further comprising a step wherein a user selects either the first video scene or the selected audiovisual take of either the first or the second role from a list of video scenes or a list of audiovisual takes, respectively, wherein either the list of video scenes or the list of audiovisual takes contains only video scenes or audiovisual takes, respectively, that are created within a period of time selected by the user.

17. The method in claim 5 further comprising a step wherein a user selects either the first video scene or the selected audiovisual take of either the first or the second role from a list of video scenes or a list of audiovisual takes, respectively, wherein either the list of video scenes or the list of audiovisual takes contains only video scenes or audiovisual takes, respectively, that are recorded by at least one grouping selected by the user.

18. The method in claim 5 further comprising a step wherein a user selects either the first video scene or the selected audiovisual take of either the first or the second role from a list of video scenes or a list of audiovisual takes, respectively, wherein either the list of video scenes or the list of audiovisual takes is ordered by at least one criterion selected by the user.

19. The method in claim 5 further comprising a step wherein a user selects either the first video scene or the selected audiovisual take of either the first or the second role from a list of video scenes or a list of audiovisual takes, respectively, wherein either the list of video scenes or the list of audiovisual takes also contains at least one of the following: a comment, a message, or a rating.

20. The method in claim 5 further comprising a step wherein either the first video scene or the selected audiovisual take of either the first or the second role is rated automatically according to a criterion.

* * * * *